April 26, 1966 L. SPALDING 3,248,020
HIGH PRESSURE SOURCE FOR VISCOUS LIQUIDS, ESPECIALLY THOSE
CONTAINING SUSPENDED ABRASIVE PARTICLES
Filed Oct. 9, 1964 4 Sheets-Sheet 4

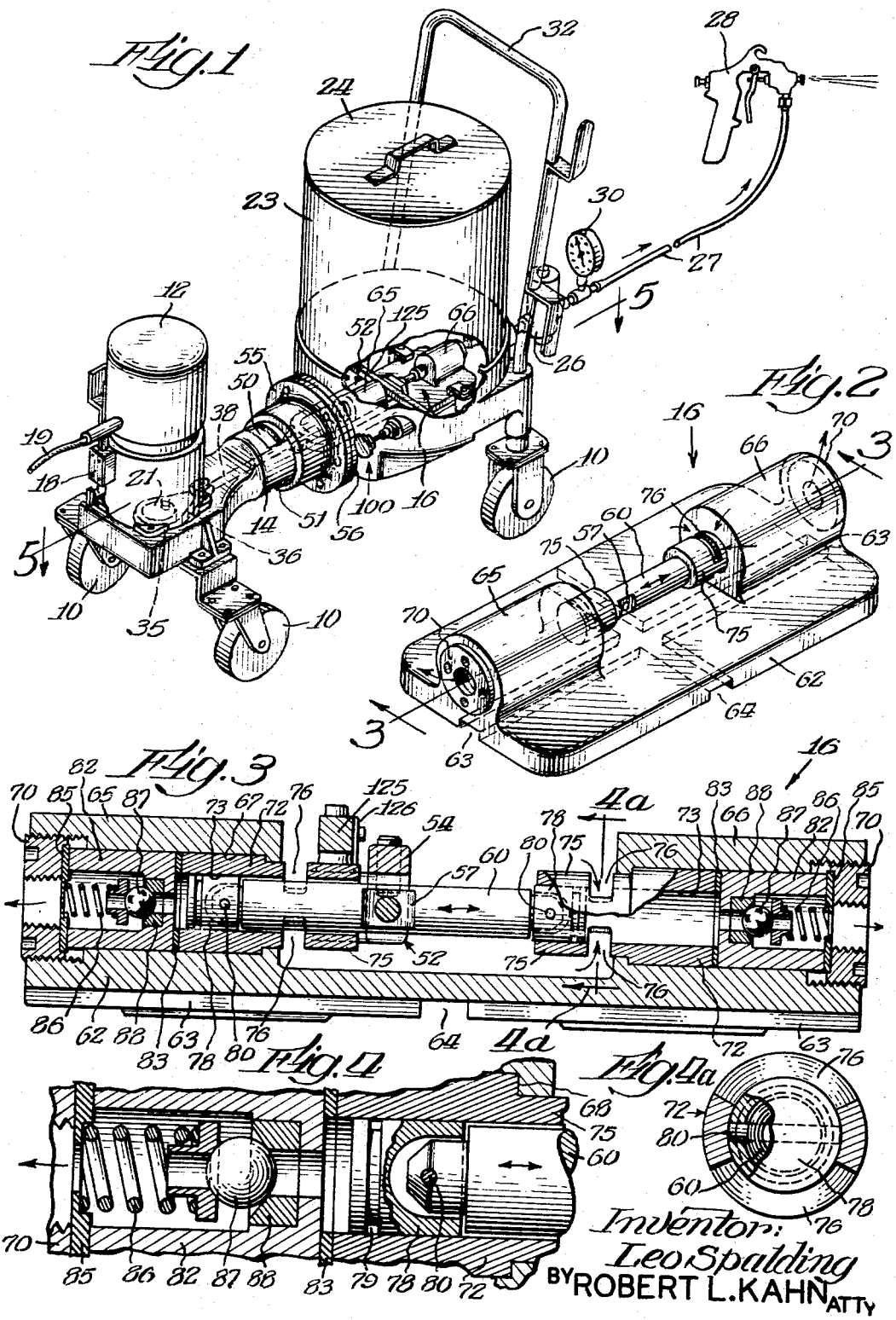

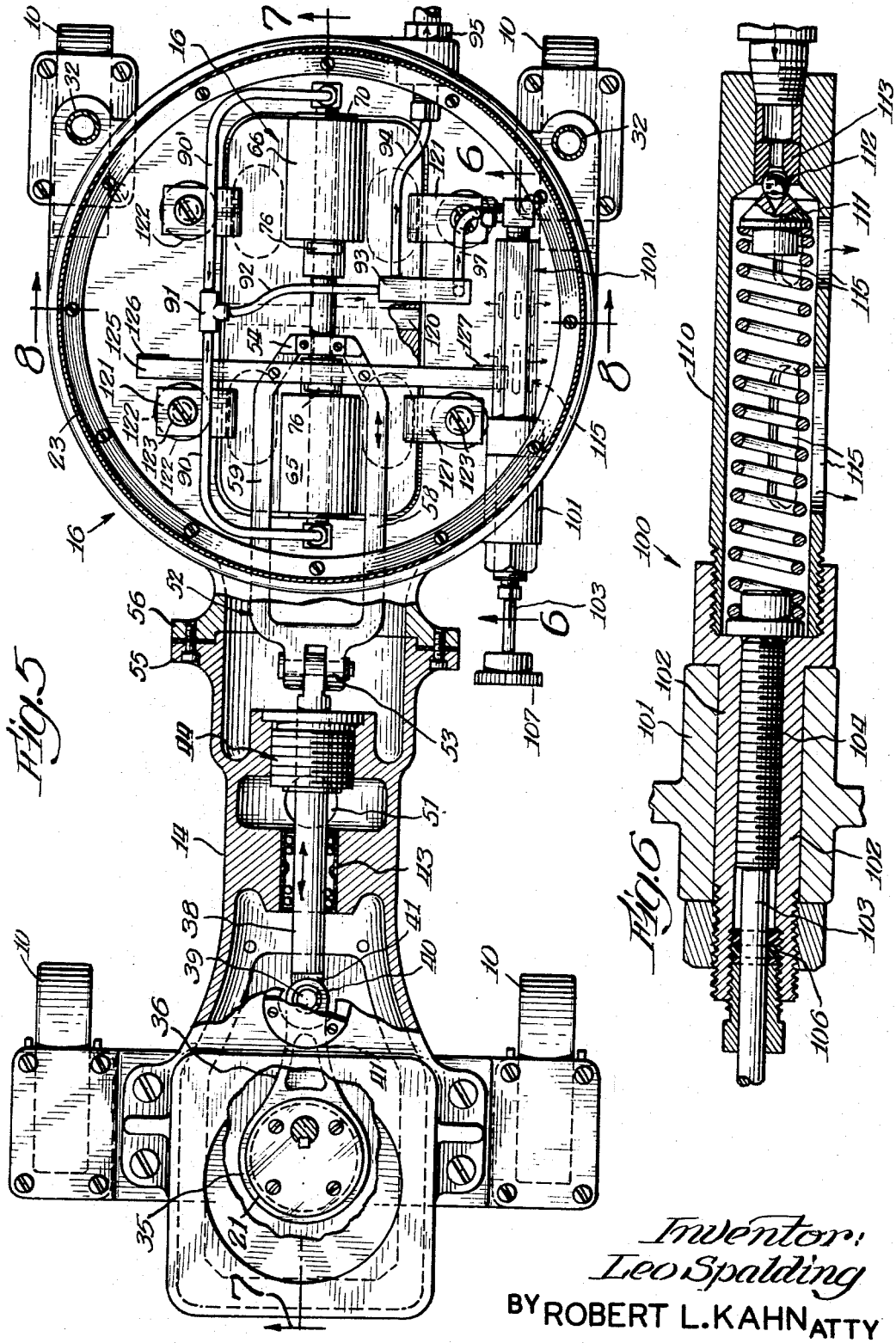

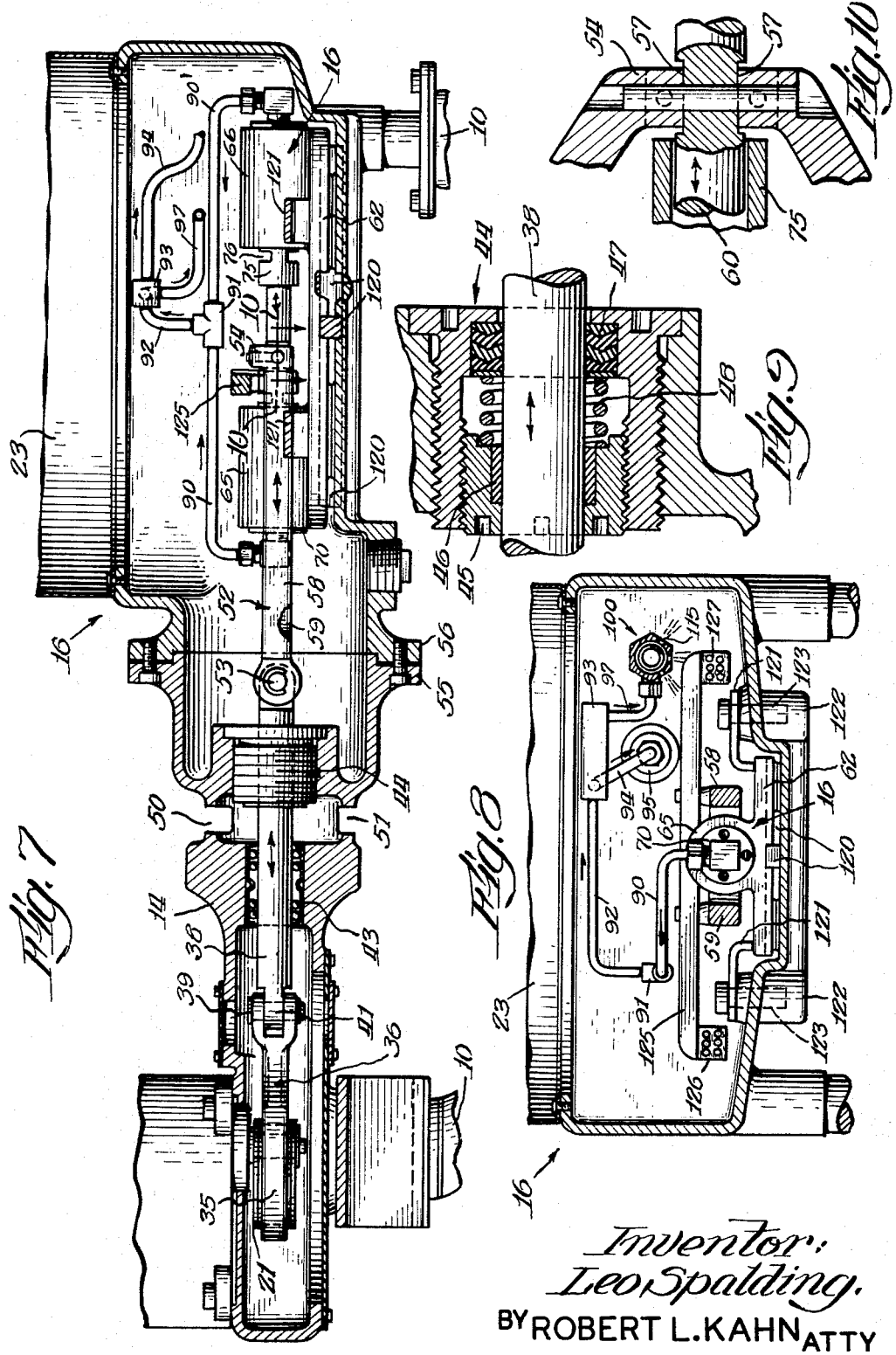

Inventor:
Leo Spalding
BY ROBERT L. KAHN ATTY

United States Patent Office 3,248,020
Patented Apr. 26, 1966

3,248,020
HIGH PRESSURE SOURCE FOR VISCOUS LIQUIDS, ESPECIALLY THOSE CONTAINING SUSPENDED ABRASIVE PARTICLES
Leo Spalding, Franklin Park, Ill., assignor to H. G. Fischer & Co., Franklin Park, Ill., a corporation
Filed Oct. 9, 1964, Ser. No. 402,812
7 Claims. (Cl. 222—243)

This invention relates to a high pressure source for viscous liquids or slurries and especially those containing suspended abrasive particles. While the invention is generally applicable to supplying substantially any kind of liquid or slurry under high pressure, it has particular application to high viscosity slurries containing highly abrasive materials in finely divided form. While not limited thereto, and merely by way of example, a field of use for the invention will be discussed to illustrate the nature of the problems present.

In the field of painting or coating by spray guns, many of the coating materials used are slurries or suspensions of metallic oxides in various liquid vehicles. In many instances, the desirable liquid vehicles, insofar as the coating material alone is concerned, are high viscosity materials. This characteristic is all too common in painting materials for hand application by paint brushes. Even then, the coating material has to be thinned out with solvents, such as turpentine, to facilitate the actual painting. It is clear that the thinning material, as turpentine, represents an ingredient whose utility and expense are dictated solely by the inability to apply the real coating material on the desired regions with efficiency and economy. The thinner itself creates additional problems in regard to evaporation. Generally thinners are highly volatile and inflammable so that conditions for drying of paint are dictated largely by the thinner. It is clear that the greater the amount of thinner per unit volume of pure coating material, the greater the added expense for not only the thinner per se but also for meeting the collateral problems of handling and accommodating the thinner (greater bulk of material, ventilation problems, fire and explosion dangers).

Where coating materials are applied with spray guns, the problem of supplying coating material to the gun may be quite formidable. This is particularly true in those spray gun systems where atomization of the coating material upon discharge from the gun is effected largely or completely by hydraulic or hydrostatic principles. Thus it is well known that any liquid subjected to a high pressure and suddenly discharged into atmosphere will be atomized. Even in the case of an electrostatic coating system, if the gun is of the hydraulic type where coating material under great pressure within the gun is suddenly discharged into atmosphere, the atomization of the coating material is practically all mechanical. The electrostatic part comes into play in improving the coating efficiency after atomization.

Hydraulic guns, whether for electrostatic systems or not, must supply coating material under pressures of at least about 500 pounds per square inch and generally much higher, such as about 2500 pounds per square inch. Supplying coating material at substantial viscosities to such hydraulic guns has required the use of large amounts of thinners. Where abrasive particles are present in such thinner coating materials, the problem has been so formidable as to be practically insoluble. In locations as factories where portability and adequate electric power, space and service are not deterrents, present-day means for supplying paints at high pressure have been characterized by short operating life, complicated and expensive equipment, and size and weight and operating technique involving a team of men to handle and use the entire system. Insofar as portability is concerned, the available equipment has rendered this an unattainable goal. The available equipment is not portable, requires several men to handle; requires considerable space and electric power to operate, thus limiting possible locations; and can not be relied upon without danger of requiring servicing or repair.

The combination of substantial viscosity and high pressure of an abrasive liquid or slurry aggravates the problem of wear of pump operating parts. Unless mechanical efficiency is high, a pumping system is bound to be massive and require a high power input. These factors alone militate against portability and criticality of location of a pumping system.

This invention makes possible a mechanically simple and highly efficient pump system for supplying liquids under high pressure in quantities which are limited by the size of a unit. The liquids which can be handled by the new pump system may have substantial viscosity of the order of molasses at normal room temperature. What is more important is that the new pumping system can operate on liquids or slurries have a high abrasive content such as is present in conventional paint having abrasive pigment with little or no thinner therein. Examples of such pigments are various oxides of iron, oxides of other metals, silicates of aluminum or other metals and pigments and fillers generally used in various industrial operations.

The new pumping system is so efficient and compact that, for the first time, a truly portable hydraulic spray gun coating system is possible. This is brought about by the fact that the pumping system is so compact and light as to be susceptible to one man handling. In addition, the electric or other power requirements of the pumping system embodying the invention are low enough so that no power source problems exist. Insofar as electric power is concerned, the new pumping system is driven by an electric motor requiring no more power than such appliances as household vacuum cleaners, electric irons, etc., rated at about 1500 watts. For power sources other than electricity, as gas engines, a small, popular engine such as used on lawn mowers for the home is quite ample. Such gas engines are readily available.

A pumping system embodying the present invention utilizes a piston type of pump, preferably there being two cylinders with pistons arranged in opposed relation. Each pump (a cylinder and piston cooperate to provide a pump unit) has a novel intake arrangement, the pumps being located in a pool or body of liquid or slurry being pumped. The intake arrangement is such that the pressure forcing the material into the pump cylinder is the combination of atmosphere plus the head of the liquid pool above the cylinder intakes. It is understood that the pool in which the pump units are immersed may be subject to a pressure greater than atmosphere. However, in actual operation, a pump system works very well with the pool at atmospheric pressure and the liquid head being of the order of about two or more inches, although the depth of the pool is not important. It is only necessary that the pump inlets be completely immersed in the liquid or slurry.

The intake arrangement provides an easy and low resistance path for slurry to enter the cylinder at a properly timed part of the pumping cycle. The new system provides such an arrangement of pump units as to reduce the instantaneous power demands of the entire pump system. Thus a more uniform power cycle for a complete operation of the two pump units is made possible. This makes for a smaller overall power intake and lessens the necessity for energy storage in a heavy flywheel, characteristic of a press. The easy access of the liquid or suspension to the interior of a cylinder at appropriate times makes possible high speed operation of the pump units without loss of efficiency.

In order for the pump cylinders to be able to withstand wear from solid particles in a suspension, it is essential that the opposing working surfaces in the pump units be harder than the particles in the suspension. For handling paint pigment suspensions, it is preferred to have the opposed working surfaces of tungsten carbide. For many purposes, the pistons and cylinders may be made of tungsten carbide. The carbide particles are cemented together as in the manufacture of tools of this material. The fabrication of pieces of tungsten carbide is highly developed. As a rule, parts of tungsten carbide are used where its hardness is relied upon to resist wear. Accordingly, such tungsten carbide parts are finished to a high degree of accuracy. For pump units embodying the present invention, the tungsten carbide surfaces are finished by lapping or honing or other steps to a smoothness of the order of about 10 microinches (.000010″) or less. The actual clearance between cylinder and piston walls may be of the order of about a few thousandths of an inch or less. The degree of smoothness of the opposed sliding pump surfaces is such that on the average, any hill or depression in the surface will be substantially smaller than the average size of the suspended particles in the mixture being handled by the pump.

Instead of tungsten carbide, other hard surface materials may be used. For certain pigments, materials softer than tungsten carbide may be used and still provide a good working life. Thus certain steels having nitrided surfaces are very hard and may be used. Also cast iron or cast steel may be treated to provide hard wearing surfaces. In addition, ceramic clad metal may be fabricated to provide hard, accurate working surfaces. In general, tungsten carbide has a hardness of about 9.5 with respect to diamond hardness of 10. Other materials having a hardness going down to 7.5 or even less may be used with advantage in making practical use of the invention.

Even with tungsten carbide, the new pump units have a working life which, while much longer than presently available equipment can provide, is still shorter than pumps operating on conventional liquids as water, substantially free of abrasives and normally creating low pressures of the order of 100 pounds per square inch. Accordingly, the new system permits of the ready and convenient interchange of pump units. These are so small and light that a spare pair of units can be available and installed any place.

For a full understanding of the invention, reference will now be made to the drawings showing an exemplary embodiment thereof.

In the drawings:

FIGURE 1 is a perspective view, with certain parts broken away, of a pumping system embodying the present invention and showing also a spray gun attached to the pumping system by a hose to be supplied by the pumping system;

FIGURE 2 is a perspective detail of the two pump units on a cylinder housing base;

FIGURE 3 is a section, with certain lines or certain parts broken away, taken on line 3—3 of FIGURE 2;

FIGURE 4 is an enlarged detail of the left pump unit illustrated in FIGURE 3 shown on a somewhat larger scale;

FIGURE 4a is a sectional detail on line 4a—4a of FIGURE 3;

FIGURE 5 is a section taken along broken line 5—5 of FIGURE 1;

FIGURE 6 is a section along broken line 6—6 of FIGURE 5 illustrating the relief valve structure;

FIGURE 7 is a section taken on line 7—7 of FIGURE 5;

FIGURE 8 is a section taken on line 8—8 of FIGURE 5;

FIGURE 9 is an enlarged detail of the bearing portion for the drive coupling rod;

FIGURE 10 is an enlarged detail taken on line 10—10 of FIGURE 7;

FIGURE 12, however showing the point supply drum which was omitted from FIGURE 11.

Figure 11:
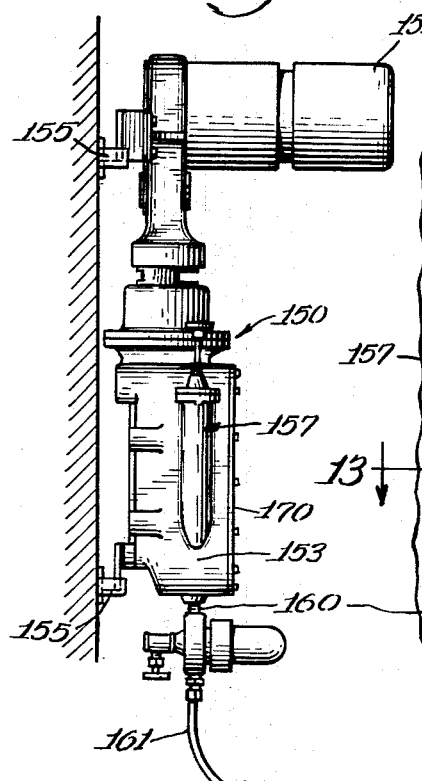
FIGURE 11 is an elevation of a modified form of mounting for the new pump system.

Referring first generally to FIGURE 1, the entire pump system is illustrated by way of example as being carried by castors or rollers 10 for convenient moving around and for convenience in handling. The exact manner of mounting of the entire system may be varied. The system generally includes a source of power which may be an electric motor 12, this including suitable speed-reducing means; power drive means 14 and the pump system proper 16. Electric motor 12 may be provided with a suitable switch control 18 which, for safety sake, is preferably of the explosion-proof type. Electric motor 12 is supplied with electricity by cable 19 for connection to any conventional wall plug. Electric motor 12 may be of any type, either universal or of the alternating current type. The speed reducing means associated with the electric motor is adapted to provide an output speed of about 300 r.p.m.

Instead of an electric motor, a gas engine or any other type of power may be substituted, it being understood that the power drive 14 shall be actuated by suitable means corresponding to a rotary speed of about between 200 and 300 r.p.m. For special purposes, units may be designed for higher or lower speeds.

The power output from motor 12 and the speed reducing means associated therewith appears at eccentric 21 for oscillatory movement by means to be set forth in detail later. The power transmitting means within housing portion 14 extends right up to the bottom of the pump unit 16. Pump unit 16, as illustrated in FIGURE 1, includes a pump housing 23 having cover 24. The material being pumped, such as, for example, a thick mixture of paint or enamel, may be poured into housing 23 by removing cover 24. The output of the pump is fed through a suitable filter unit 26 to hose 27 going to a spray gun 28. Pressure gauge 30 is connected in output hose 27 for indicating the pressure in the outgoing line. The entire machinery may be moved around by means of handle 32.

Referring now to FIGURES 1, 5 and 7, the description of the power drive from eccentric 21 will now be given. Eccentric 21 is provided with strap 35 which is part of crank arm 36 whose end is coupled to drive coupling rod 38. The coupling is effected by pin 39 passing through clevis 40 of the crank arm with reduced portion 41 of drive coupling rod 38. Drive coupling rod 38 is mounted for straight rectilinear movement and to this end is journaled in ball-bearing type of bushing 43 carried by a portion of housing 14. Drive coupling rod 38 extends through a packing sleeve or gland 44 which includes as a part thereof a threaded take-up sleeve forming the outside of the gland and having suitable recesses 45 for engagement by means of a spanner-type of wrench. As illustrated in FIGURE 9, the gland includes bearing 46 and packing 47 disposed between suitable shoulders in the entire gland structure. A compression spring 48 is provided for keeping the packing tight in position. The details of the packing gland illustrated in FIGURE 9 may be varied.

In order to render gland nut 44 accessible for tightening from the outside, opening 50 is provided in the housing 14 to permit the insertion of a wrench. A bottom opening 51 is provided for drainage. Drive coupling rod 38 extends through packing gland 44 to the right as seen in FIGURE 7 and is coupled to yoke structure 52 by means of a pin and clevis arrangement 53 similar to the one described for coupling to the eccentric. The drive coupling rod may be made of any suitable material such as ordinary steel or brass but is preferably made of stainless steel to resist corrosion, and also to resist wear. This latter part is important for the reason that there may be some danger of getting some of the abrasive material handled on the packing rod. However, the amount of material which may fall on the packing rod is generally too small to warrant providing the drive coupling rod with a very hard surface. Since the only function of the coupling rod is to provide a driving connection between the eccentric and the yoke, it is obvious that no fine fits or no extraordinary mechanical problems exist.

The housing for the drive mechanism so far described, and generally indicated by 14, terminates in a circular flange 55 which is adapted to cooperate with and be disposed opposite a corresponding circular flange 56 from the pump housing and constitutes a lateral extension of the pump housing base. As is clearly evident in FIGURE 5, one end of yoke 52 extends into the region between the opposing flanges. It is understood that the flanges are bolted together as indicated in FIGURE 5 and that the opposing flanges have suitable gaskets therebetween to provide a tight connection.

Driving yoke 52 has the two arms thereof, 58 and 59, joined together at the end thereof by cross links 54 which are shaped to be pinned to finished flat coupling faces 57 of piston connecting rod 60. Rod 60 is adapted to be reciprocated along the length of the rod by the drive means so far described. It is preferred to have rod 60 of non-corrosive material such as stainless steel.

Rod 60 extends between two pistons in two cylinder units, illustrated in FIGURES 2, 3 and 4. The piston and cylinder making up one pump unit are mounted on a cylinder housing base 62 which may be of cast iron or cast steel. Cylinder housing base 62 is provided with suitable means such as keyways 63 and 64 cooperating with corresponding keyways and keys in the pump housing base, to be described, for accurately locating the cylinder housing base. This is desirable in the event that the pump units are removed for repair or replacement. Any other means for accurately locating the cylinder housing base on the pump housing base may be provided. Cylinder housing base 62 carries cylinder housings 65 and 66 which are aligned as illustrated in FIGURES 2 and 3. Inasmuch as the two pump units are the same, it will only be necessary to describe one in detail. Cylinder housing 65, for example, has cylindrical chamber 67 therein, at the inner end of which there is provided shoulder 68. By "inner end" is meant the end of the cylinder housing facing the opposing cylinder housing. The outer end of cylinder housing 65 is threaded to provide a nut 70 for tightening or loosening by means of a spanner wrench. Nut 70 is in the form of a sleeve and is used to retain an outlet valve cage and structure, to be described.

Disposed within cylinder 67 and against shoulder 68 is pump cylinder 72. Pump cylinder 72 is in the form of a simple cylinder having the shoulder to bear against shoulder 68 of the cylinder housing. Cylinder 72, however, must be of hard material such as, for example, tungsten carbide or any of the other materials previously referred to. The inside surface 73 of cylinder 72 is the surface whose smoothness must be finished to an extremely high degree of accuracy, as previously described.

Cylinder 72 has extension 75 which extends outwardly beyond the inner end of cylinder housing 65. Portion 75 is provided with two or more intake ports 76. The angular extent of the ports, the number and the dimensions thereof may be varied within wide limits depending upon the material being handled, the viscosity, the speed of operation of the pump and other factors. In general, however, it is desired that the angular extent of the ports and the dimensions thereof be as great as possible to provide a low resistance intake for liquid or suspensions.

Operating within cylinder 72 is piston 78. Piston 78 is preferably of the same hardness as the cylinder and is also finished to the same degree of smoothness. The actual clearance between the piston and cylinder, however, may be of about a few thousandths of an inch. No attempt need be made to have the clearance down to anywhere near the dimensions of the smoothness of the surface. Such a clearance would not permit the parts to work and may result in binding.

Piston 78 is of conventional construction and is provided with annular groove 79 in which material being operated upon may collect for effecting sealing of the piston in the cylinder. Any other type of construction for effecting sealing between the piston and cylinder may be provided.

Piston 78 is coupled to the flattened end of the piston connecting rod 60 by means of transverse pin 80 extending through the skirt of the piston and through the end of the connecting rod.

Cylinder 72 is maintained tightly in position against shoulder 68 of the cylinder housing by exhaust valve cage 82 which is forced against washer 83 disposed between the valve cage and cylinder 72. Valve cage 82 is kept in position and maintained tightly by means of threaded annular fitting 70 previously described. Annular fitting 70 has washer 85 between it and the adjacent end of the valve cage, washer 85 having a reduced aperture therethrough to maintain exhaust valve spring 86. Spring 86 is part of an exhaust valve assembly including valve ball 87 and valve seat 88. Valve seat 88 is preferably of a hard material and in this instance, it is desirable to use tungsten carbide. The seat is disposed firmly in a recess in cage 82. Valve ball 87 is also of a hard material and may be of tungsten carbide or of stainless steel.

The outlet of the exhaust valve is connected to suitable tubing 90 of steel or copper. The connection to the tubing is effected by means of conventional high pressure fittings. The two branches 90 and 90' from the two pump units are branched together to T 91 and thence go by way of tubing 92 to fitting 93. Fitting 93 has one outlet 94 going to coupling 95 carried by the wall of the pump housing base for connection to hose 27 of the gun or for any other load to be supplied by the high pressure material. Fitting 93 has its other outlet 97 connected to relief valve 100. The purpose of providing relief valve 100 is to prevent the generation of excessive pressure. Relief valve 100 is shown in detail in FIGURE 6 and includes boss 101 rigidly secured in the pump housing base. Disposed within boss 101 is sleeve 102 carrying pressure adjusting rod 103. Rod 103 has portion 104 threaded for cooperation with the threaded interior of sleeve 102, the remaining portion of rod 103 passing through a packing gland 106 and extending outside of the housing and carrying handle 107 for adjustment. Sleeve 102 has the inside end thereof internally threaded to accommodate relief valve barrel 110. This barrel contains the relief valve compression spring and the usual relief valve consisting of valve retaining portion 111, valve ball 112 and valve seat 113. The valve seat is carried in the reduced end of relief valve barrel 110. Both the ball and the seat are preferably of hard material such as tungsten carbide or the like. The connection between pipe 97 and the relief valve is established by conventional high pressure fittings as illustrated.

Relief valve barrel 110 is provided with a number of relief valve ports 115 on the bottom portion of the relief valve barrel. The barrel is so oriented that the relief ports face the bottom of the pump housing base. As a result, if and when the relief valve blows, the material discharged thereby is directed toward the bottom of the pump housing and will not tend to blow any of the paint material up toward the top of the housing.

The pump housing base, which has previously been indicated by 16, is a heavy casting which has slots machined therein corresponding to keyways 63 and 64 of the cylinder housing base. The base ends for the pump housing and the cylinder housing are locked against relative rotation for turning by means of keys 120. As previously indicated, other means for orienting the position of the cylinder housing base and the pump housing base may be provided. The cylinder housing base is bolted down in position on the pump housing base by lugs 121 cooperating with pads 122 forming part of the pump housing base structure. Bolts 123 passing through suitable openings in the lugs and engaging threaded recesses in the pads will retain the entire pump unit assembly in position.

Means are provided for agitating the contents of the pump housing. This means comprises beam 125 rigidly secured to yoke arms 53 and 54 adjacent the coupling end portion 55. Beam 125 extends transversely across the axis of the two pump units and generally between the same and carries at the ends thereof paddle members 126 and 127. These may be plates having suitable openings therethrough for preventing some flow of liquid therethrough. The dimensions, shape and positioning of the paddles may be varied to suit the requirements of the entire system. It is clear that the paddle beam 125 will be reciprocated back and forth transversely of its length and parallel to the axis of the pump units. The base portion of the pump housing, which has been generally indicated by 16, is sufficiently deep so that the pump units and the like can be accommodated. However, the top edge of the base unit is preferably finished to provide a smooth flange upon which there can be bolted the tank portion 23. It is understood that tank portion 23 will be bolted to the pump housing base by and maintained tightly by suitable bolts and gaskets in conventional fashion.

The operation of the entire system so far described is as follows. Upon energization of the electric motor or whatever means is used to drive the pump system, piston connecting rod 60 will be reciprocated back and forth between predetermined end positions. This reciprocation will cause the pistons at the two ends thereof to be moved back and forth. Considering one piston at a time, and for the moment considering the left-hand portion in FIGURE 3, it will be noted that the piston there is at the extreme inward position for discharging material under high pressure through the exhaust valve. Upon the return stroke, it is clear that a powerful suction in the cylinder will be created. It is obvious that the exhaust valve will be tight so that the suction can be created. When the piston extends beyond annular cylinder ports 76, as illustrated for example in the right-hand unit of FIGURE 3, the port will be wide open for receiving material into the cylinder. It is evident that just as the end of the piston remote from connecting rod 60 begins to crack the space at the intake port 76, the suction together with the pressure of the liquid contents at the port will start to flow the material into the cylinder. In fact, the liquid contents within the pump housing outside of the pump cylinder will be at the ports 76 and contacting the outside of the piston as it is moving to the outer position. Thus when the piston reaches its extreme position as shown in the right piston unit of FIGURE 3, the intake ports will be wide open to permit the free flow of material within the housing to enter the cylinder. The movement of the piston toward pressure generation will be conventional. However, because of the arrangement of the two pump units, it is evident that when the ports are being opened by the piston for receiving the coating material due to the suction in the cylinder, the companion piston in the other cylinder is compressing. This, of course, imposes a substantial load momentarily on the drive mechanism. The operation of the suction is such that as the vacuum in the cylinder is broken by the entry of the material, there will be a tendency to create some force for aiding the piston toward completing its intake stroke and begin to compress while the other piston is actually doing the compressing. Thus, specifically referring to the two units, when the piston connecting rod 60 is starting to move to the right, as illustrated in FIGURE 3, there will be a suction created in the cylinder of the left unit. While this suction is being created, the piston in the right unit is beginning to close the port and just about the time when the piston in the right unit must begin to create pressure in the cylinder for expelling the contents in the right cylinder, the suction in the left cylinder is being cracked open and the piston has thus been given a push toward the right to help in initiating the compression stroke of the right cylinder.

The system thus far described, when made of tungsten carbide and suitably polished as heretofore stated, can operate satisfactorily for periods of the order of about one week of normal working hours with highly abrasive enamel or paint. Prior systems operating on the same material have been very much more complicated and have not been able to operate for more than two or three hours without a breakdown.

In the system so far described, it is understood that cover 24 on housing 23 will permit the entry of air to the interior so that as the paint or other material is pumped out of the container, air will be permitted to enter. While the system illustrated and described is movable on wheels as illustrated and described, it is possible to have a different sort of mounting for the system.

Figure 12:
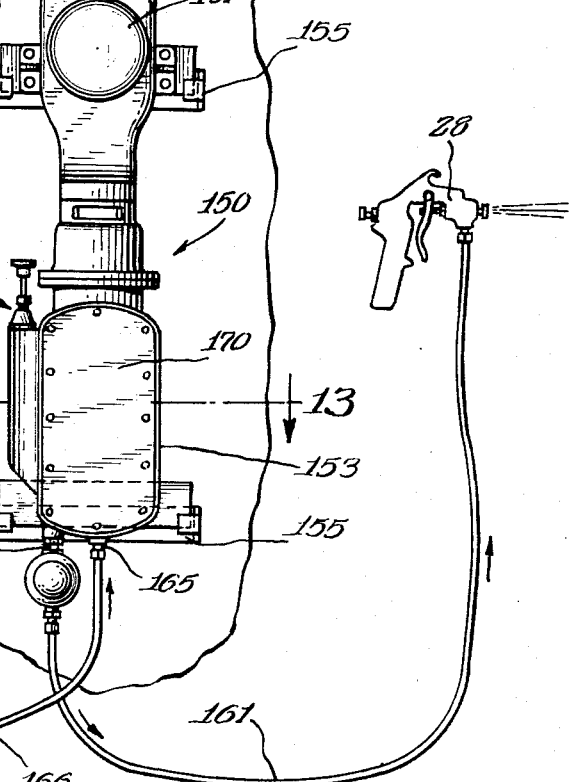
FIGURE 12 is a front elevation of the modified mounting illustrated in FIGURE 1.
Figure 13:
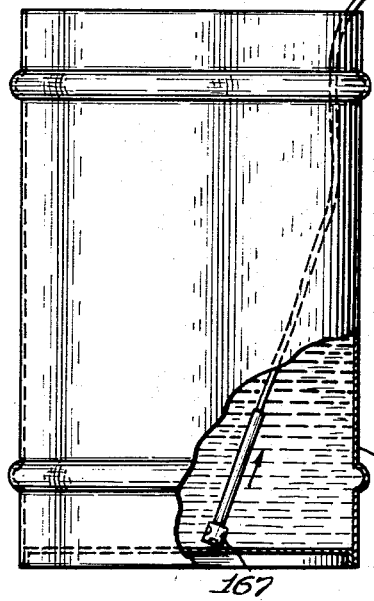
FIGURE 13 is a section on line 13—13 of FIGURE 12.

Referring now to FIGURES 11 to 13 inclusive, a modification is illustrated wherein the pump system is adapted for wall mounting and may be used in connection with a large paint drum of conventional size such as, for example, the usual 55-gallon drums that such material usually comes in. Referring to FIGURES 11 to 13 inclusive, a complete pumping system, generally indicated by 150, will be powered by any suitable means such as an electric motor 151 connected to drive the pump system through suitable reduction gearing and generally having the same structure described in connection with FIGURES 1 to 10 inclusive. The pump system has housing 153 which is preferably substantially smaller in volume as compared to the housing 23 referred to in FIGURE 1. The entire system is hung on brackets 155 on a wall or may be secured in any desired manner. The relief valve is mounted on the side as before, and is indicated by 157, to be available for ready adjustment.

The outlet of the system is at 160 and is adapted to be connected through hose 161 to a spray gun of conventional construction. As has been previously indicated, the spray gun in all cases may be part of a conventional or part of an electrostatic spraying system.

The intake for housing 153 which gives access to the interior of the contents is at 165 and is connected by hose 166 terminating in intake check valve 167. This intake valve is adapted to suck paint or other material from the bottom of drum 168. Suitable means for agitating the contents of drum 168 to prevent settling can be provided, this being well known in the art.

It is evident that the air pressure within housing 153 will be somewhat below atmosphere, depending upon the difference in elevation between outlet fitting 165 and intake nozzle 167. Accordingly, it is necessary for the housing to be airtight sufficiently to prevent or to maintain the vacuum necessary to pull up the paint.

In general, the structure illustrated in FIGURES 1 to 10 inclusive will maintain a vacuum inside of the housing due to the snug fit of the packing gland, generally illustrated in FIGURE 9 of the drawing, this providing a seal between the interior of the paint housing and the interior of the housing for the drive from the motor. Such a seal is sufficient for maintaining a vacuum condition.

The bottom of housing 153 is formed by cover plate 170 which is securely bolted to the housing and sealed for gasket purposes. The interior of the mechanism is generally the same, it being understood that the paint material within housing 153 will fill the same so that the two pump units will be immersed within the paint or other material being pumped.

It will be evident that a system embodying the present invention provides a compact and highly efficient pump system, quite versatile and adaptable for various kinds of work. The high efficiency of the system, together with its light weight, makes it possible to use the system in a factory for production or out in the field for various kinds of jobs. The two pump units are so arranged as to impose minimum instantaneous power requirements on the electric motor or other means for driving the same. However, it is to be understood that a system embodying the present invention may have more or less than two pump units. Thus, for example, a simple pump unit may be provided and a suitable flywheel or other means for handling the power at various parts of a pump cycle may be provided. The dimensions of the various parts will be determined by the volume of material being handled and the pressure. For example, in one system wherein sufficient paint material for supplying two conventional spray guns had the following size pump units. The pump cylinders were of tungsten carbide with the inside cylinder surface finished to a smoothness of between about three to five microinches with the inside diameter .625". The cylinder length was two inches, about one inch being within the cylinder housing and the remainder being outside of the cylinder housing. The intake ports for the cylinder had a width (dimension parallel to the axis of the cylinder) of about $\frac{5}{16}$ of an inch and the distance across the ports between the ends (corresponding to the angular extent) was substantially $\frac{3}{8}$". This $\frac{3}{8}$" was a separation between the two adjacent ports, the actual angular extent of the port itself being something of the order of about 120 degrees of angle. This is not critical.

The pump piston for such a pump unit was also made of tungsten carbide and had the outer piston surface finished to substantially the same degree of smoothness as the cylinder. The diameter of the piston was no more than about .001" smaller than the inside diameter of the cylinder, thus providing a clearance between the opposed walls of about .0005". This, however, may be increased somewhat if desired.

The length of the piston was about .56 of an inch.

The speed of operation was about 300 r.p.m. of the eccentric for oscillating the connecting rod between the two pistons.

It is understood that a pump unit embodying the invention will have the opposing piston and cylinder surfaces of material which is harder than the suspended particles being handled and of a smoothness greater than the fineness of the suspended particles. In case the wall modification illustrated in FIGURES 11 to 13 inclusive is used, some allowance for the loss of suction at the cylinder ports may have to be made. This loss of suction will be due to the air pressure required to lift the paint or other liquid from the bottom of the barrel to the housing for the pump units. It may be possible to mount the drum containing the paint so that the bottom thereof is not too much below the level of the pump units so that the efficiency of the entire system is maintained at a high level. It is also possible to operate the pump pistons at a somewhat slower speed or increase the cylinder port area for facilitating the entry of paint or the like into the cylinder at appropriate times. In all cases, the cylinder units will be immersed in the mixture or suspension being worked on.

The entire pump system may be cleaned out easily by running through a suitable cleaning fluid such as is done with spray guns. The relief valve can also be cleaned out at that time by reducing the relief valve blow-off pressure or blocking the outlet pipe to operate the relief valve. The entire system may be drained by removing a screw plug at the bottom of the pump housing.

What is claimed is:

1. For use in a pumping system for handling liquids having suspended particles therein in sufficient density so that the mixture is a heavy suspension or slurry, a pair of opposed pumping units, each unit comprising a cylinder and piston movable therein, a cylinder base upon which the cylinders are mounted in spaced coaxial aligned relation, the open ends of said cylinders facing each other, a connecting rod between said pistons, each cylinder having at least one arcuate port through the wall thereof through which liquid may flow to the cylinder interior upon pump intakes, said intake ports being at the opposed cylinder end portions, exhaust valves at the remote cylinder ends, conduit means including a relief valve connected to said exhaust valves for receiving the pump discharge, liquid storage means in which said pump units are mounted so that the pump cylinders and relief valve are immersed within the liquid material being pumped, said relief valve including at least one discharge port facing the bottom of said liquid storage means to prevent blowing of material toward the top of said liquid storage means and means for reciprocating said piston connecting rod for pump operation.

2. For use in a pumping system for handling liquids having suspended particles therein in sufficient density so that the mixture is a heavy suspension or slurry, a pair of opposed pumping units, each unit comprising a cylinder and a piston movable therein, a cylinder base upon which the cylinders are mounted in spaced coaxial aligned relation, the open ends of said cylinders facing each other, a connecting rod between said piston, each cylinder having at least one arcuate port through the wall thereof through which liquid may flow to the cylinder interior upon pump intakes, said intake ports being at the opposed cylinder end portions, exhaust valves at the remote cylinder ends, conduit means connected to said exhaust valves for receiving the pump discharge, and liquid storage means in which said pump units are mounted so that the pump cylinders are immersed within the liquid material being pumped, means for reciprocating said piston connecting rod for pump operation, said means including a yoke coupled to said piston connecting rod and paddle means coupled to said yoke and disposed within said liquid storage means for agitating the contents to prevent sedimentation.

3. For use in a pumping system for handling liquids having suspended particles therein in sufficient density so that the mixture is a heavy suspension or slurry, a pair of opposed pumping units, each unit comprising a cylinder and piston movable therein, a cylinder base upon which the cylinders are mounted in spaced coaxial aligned relation, the open ends of said cylinders facing each other, a connecting rod between said pistons, each cylinder having at least one arcuate port through the wall thereof through which liquid may flow to the cylinder interior upon pump intakes, said intake ports being at the opposed cylinder end portions, exhaust valves at the remote cylinder ends, conduit means connected to said exhaust valves for receiving the pump discharge, and liquid storage means in which said pump units are mounted so that the pump cylinders are immersed within the liquid material being pumped, means for reciprocating said piston connecting rod for pump operation, said liquid storage means including a housing having a lateral extension, reciprocable means extending from said lateral extension to said piston connecting rod, a stuffing box for said reciprocable means for sealing purposes, and means beyond said stuffing box and outside of the liquid housing for reciprocating said means to operate said pump.

4. For use with suspension containing finely divided particles of abrasive material; a pump unit comprising a pump cylinder housing having a straight longitudinal passage therethrough extending from one end of the housing to the other end thereof; a pump cylinder sleeve fitted within the housing channel and extending from an intermediate region between said housing ends toward one of said housing and projecting beyond said one end; means for locking said sleeve against movement through said one house end, said sleeve having a cylindrical surface of one diameter only and at least one intake port through the wall thereof at the projecting sleeve portion adjacent the one end of said housing channel; a piston in said sleeve and having the head facing toward the other end of said housing, said piston being moveable within said sleeve between an intake end position where the piston head is within the projecting sleeve portion for full intake port opening and the other end position for intake port closing and exhaust; an exhaust valve assembly within said passage between the adjacent end of said sleve and the other end of said housing channel; means at the other end of said housing passage for retaining said valve assembly and sleeve against withdrawal through the other end of said housing, the opposing piston and cylinder surfaces being finished to a smoothness in the micro inch range and having a hardness greater than that of the abrasive particles and having clearance therebetween substantially greater than the degree of surface smoothness; said pump unit being adapted to be immersed in said suspension with said intake port being below the level of said suspension and exhaust valve assembly being adapted to be connected to a high pressure conduit whereby said pump unit on the intake stroke of said piston toward port opening creates a substantial vacuum in the pump cylinder chamber which aids in the flow of suspension material within said chamber and upon exhaust, said piston can develop a pressure determined by the exhaust valve of the order of hundreds of pounds per square inch for discharge through said valve, the suspension material functioning as a sealing means between said surfaces, said pump unit being readily disassembled for replacing the piston and sleeve, but normally having a substantially long useful life.

5. The pump unit according to claim 4 wherein said piston has at least one annular sealing groove.

6. The construction according to claim 4 wherein the sleeve and piston are respectively of tungsten carbide.

7. In combination with the pump unit of claim 4, a container for holding a quantity of said suspension, said container having a bottom, side walls and a cover at the top thereof, means for securing said pump unit to the bottom of said container, means externally of said container and passing through the side wall thereof for reciprocating said piston, a conduit secured to said discharge valve and passing through the wall of said container and a relief valve coupled to said discharge conduit, said relief valve being disposed within said suspension and having at least one discharge port facing the bottom of said container to prevent blowing of suspension material toward the top of said container.

References Cited by the Examiner

UNITED STATES PATENTS

| | | | |
|---|---|---|---|
| 1,613,491 | 1/1927 | Thomas | 103—171 X |
| 1,853,602 | 4/1932 | Butler | 222—333 X |
| 2,111,439 | 3/1938 | Squyars | 239—142 X |
| 2,124,580 | 7/1938 | Lavine | 222—385 X |
| 2,331,462 | 10/1943 | Denigan | 103—171 |
| 2,366,654 | 1/1945 | Rotter et al. | 222—333 X |
| 2,552,195 | 5/1951 | Lopata | 222—385 X |
| 2,561,786 | 7/1951 | Davis | 103—171 X |
| 2,762,653 | 9/1956 | Sinclair | 239—331 X |
| 3,043,224 | 7/1962 | Brown | 103—171 X |
| 3,082,917 | 3/1963 | Anderson | 222—376 X |

M. HENSON WOOD, Jr., *Primary Examiner.*

LOUIS J. DEMBO, *Examiner.*